United States Patent
Lee et al.

(10) Patent No.: US 10,167,049 B2
(45) Date of Patent: Jan. 1, 2019

(54) CRANK TREADING TORQUE DETECTION DEVICE FOR ELECTRIC BICYCLE

(71) Applicant: NATIONAL CHENG KUNG UNIVERSITY, Tainan (TW)

(72) Inventors: Sen-Yung Lee, Tainan (TW); Shueei-Muh Lin, Tainan (TW); Xue-Yi Tian, Kaohsiung (TW); Wan-You Cai, Yunlin County (TW); Bo-Syun Zeng, Kaohsiung (TW)

(73) Assignee: National Cheng Kung University, Tainan (TW)

( * ) Notice: Subject to any disclaimer, the term of this patent is extended or adjusted under 35 U.S.C. 154(b) by 88 days.

(21) Appl. No.: 15/263,788

(22) Filed: Sep. 13, 2016

(65) Prior Publication Data

US 2018/0072375 A1    Mar. 15, 2018

(51) Int. Cl.
 *B62M 6/50* (2010.01)
 *B62M 6/55* (2010.01)
 B62M 6/40 (2010.01)

(52) U.S. Cl.
 CPC .............. *B62M 6/50* (2013.01); *B62M 6/55* (2013.01); *B62M 6/40* (2013.01)

(58) Field of Classification Search
 CPC ............. B62M 6/50; B62M 6/55; B62M 6/40
 See application file for complete search history.

(56) References Cited

U.S. PATENT DOCUMENTS

| | | | | |
|---|---|---|---|---|
| 9,090,178 B2 * | 7/2015 | Tsuchizawa | ............ | B60L 15/20 |
| 9,857,252 B2 * | 1/2018 | Murugesan | ............... | G01L 3/10 |
| 2014/0305727 A1 * | 10/2014 | Gao | ........................ | B62K 19/34 |
| | | | | 180/206.4 |
| 2014/0365013 A1 * | 12/2014 | Kruse | ...................... | B62M 6/65 |
| | | | | 700/275 |
| 2015/0122565 A1 * | 5/2015 | Deleval | ..................... | B62M 6/55 |
| | | | | 180/206.3 |
| 2016/0297499 A1 * | 10/2016 | Ohashi | ...................... | B62M 6/45 |

FOREIGN PATENT DOCUMENTS

| | | | |
|---|---|---|---|
| CN | 302840285 | | 6/2014 |
| EP | 2910462 | * | 8/2015 |
| TW | M482547 U | | 7/2014 |
| TW | M483912 U | | 8/2014 |
| TW | D171640 | | 11/2015 |
| TW | D175696 | | 5/2016 |
| TW | D178583 | | 10/2016 |

* cited by examiner

*Primary Examiner* — Joseph M Rocca
*Assistant Examiner* — Marlon A Arce
(74) *Attorney, Agent, or Firm* — Rosenberg, Klein & Lee

(57) ABSTRACT

A treading torque detection device includes a pre-set trading torque and a motor. The torque from the pre-set trading torque and the torque from the motor are respectively connected to a hollow tube mounted to an axle via a first one-way transmission device and a second one-way transmission device. The two respective powers are transmitted to a chainwheel by the hollow tube. A torque detection unit us connected to the hollow tube and located between the first and second one-way transmission devices. The power from the motor and the treading torques from the two ends of the axle do not affect to each other. When the torque detection unit detects a torque that is higher than the pre-set trading torque, the motor is activated to provide power, and the detected torque is reduced to the pre-set torque.

8 Claims, 6 Drawing Sheets

CRANK TREADING TORQUE DETECTION DEVICE FOR ELECTRIC BICYCLE

BACKGROUND OF THE INVENTION

1. Fields of the Invention

The present invention relates to a treading torque detection device, and more particularly, to a treading torque detection device for detection of treading torque of each of two ends of the crank of an electric bicycle.

2. Descriptions of Related Art

The conventional electric bicycle generally comprises an electric motor which assists the riders to drive the bicycle when needed. The motor can be installed to the front wheel, the middle portion, or the rear wheel of the electric bicycle. The motor at the middle portion of the electric bicycles has become the most common design, and the treading torque of the axle is one of the main factors for controlling the motor.

The ideal treading torque detection device for the motor installed to the middle portion of the electric bicycle should be compact and the treading torque and the output power from the motor have to be connected to the same axle so as to be transferred to the chainwheel. When only the treading torque is transferred, the torque detection device has to precisely detect the two respective torques output from the two ends of the axle, and not affected by the magnetic force from the motor. When only the motor outputs the torque, the torque detection device is not supposed to detect the torque from the motor. Furthermore, when the torque detection device detects the torque that is higher than a pre-set value, the motor is activated to provide power to assist the rider to drive the bicycle, while the detected torque is reduced to the pre-set value. The control the treading torque has to be simple, precise and is not affected by factors from outside.

However, the conventional torque detection device is directly connected to the axle of the bottom bracket, so that the torque detection device can only detect the torque from one end of the axle. If the two respective torques of the axle are to be detected, two torque detection devices are needed to be installed to two sides of the chainwheel. This results a higher manufacturing cost.

Another conventional electric bicycle has a hollow tube mounted to the axle, and the one torque detection device is connected to the hollow tube. When the torque detection device is cooperated with the power from the motor, the transmission of the power form the motor is affected by the treading torque. If a one-way transmission device is only connected to the axle and the hollow tube, the treading torque is affected by the dragging force from the motor. If a one-way transmission device is only connected to the motor and the hollow tube, when the motor is in action, the axle is forced to be co-rotated with the motor, and this makes uncomfortable feel to the rider.

Yet another conventional electric bicycle has a hollow tube mounted to the axle, but the torque detection device is not connected to the hollow tube. When the torque detection device detects the torque that is higher than the pre-set value, and the motor provides the power, the detected torque does not reduce, it increases. This makes the control of the torque become incorrect and difficult. Besides, the torque detection device is exposed and easily affected by weather or foreign objects.

U.S. Publication No. 20120048634 discloses a bicycle with auxiliary power unit, wherein the hollow tube is mounted to the axle and directly connected to the chainwheel. The motor has a shaft which is connected to the gear, another shaft, and the chainwheel. The three respective chainwheels are connected by a chain. The power transmission of the motor is not connected with the hollow tube. The whole system is bulky and not precise. There are two chainwheels involved in the power transmission so that energy are consumed during the transmission via the chainwheels.

Taiwan Utility Model M451316 discloses a hollow tube mounted to the axle, a torque detection device, one-way clutch and a chainwheel, however, they are not connected with the motor at the middle portion of the bicycle. The design can only be cooperated with the bicycles with a front driving device and a rear driving device.

The present invention intends to provide a treading torque detection device of an electric bicycle for detection of treading torque of each of two ends of the crank, and the present invention eliminates the shortcomings mentioned above.

SUMMARY OF THE INVENTION

The present invention relates to a treading torque detection device detecting a treading torque of each of two ends of the crank of an electric bicycle, and comprises a motor installed at the middle portion of an electric bicycle. The torque from a treading torque source and the torque from the motor are respectively connected to a hollow tube mounted to an axle via a first one-way transmission device and a second one-way transmission device. The two respective powers are transmitted to a chainwheel by the hollow tube. A torque detection unit is connected to the hollow tube and located between the first and second one-way transmission devices.

The two respective treading torques on two ends of the axle are transmitted to the chainwheel via the axle, the first one-way transmission device, the hollow tube and the torque detection unit. The power output by the motor is transmitted to the chainwheel via the second one-way transmission device and the hollow tube. The power from the motor and the treading torques from the two ends of the axle do not affect to each other. When only the motor outputs power, the torque detection unit does not detect torque. When the motor is not in action, the torque detection unit detects the two respective torques at the two ends of the axle. When the torque detection unit detects a torque that is higher than the pre-set treading torque, the motor is activated to provide power, and the detected torque is reduced to the pre-set torque.

Preferably, the motor and the hollow tube share a common axis.

Preferably, the motor and the hollow tube do not share a common axis.

Preferably, the torque detection unit is a torque sensor.

Preferably, the axle and the hollow tube are inserted through a bottom bracket of an electric bicycle.

Preferably, the chainwheel is a front chainwheel of an electric bicycle.

Preferably, the axle has two cranks respectively connected to the two ends thereof.

Preferably, the motor has a housing mounted thereto.

The present invention is suitable for being used to a motor installed to a middle portion of an electric bicycle. The two respective treading torques on two ends of the axle are transmitted to the chainwheel via the axle, the first one-way transmission device, the hollow tube and the torque detection unit. By the first and second one-way transmission devices, the power from the motor and the treading torques from the two ends of the axle do not affect to each other. When only the motor outputs power, the torque detection unit does not detect torque. When the motor is not in action, the torque detection unit detects the two respective torques at the two ends of the axle, such that the present invention activates the motor to provide compensation power to the rider according the actual treading torque applied to the bicycle. The motor assists the rider in a stable and safe way. The present invention is compact and easily controls the treading torque, and does not affect by outside factors.

When the torque detection unit detects a torque that is higher than the pre-set treading torque, the motor is activated to provide power, and the detected torque is reduced to the pre-set torque. This avoids the motor providing exceeded power to the bicycle, so that the rider operates the bicycle safely.

The torque detection unit is connected to the hollow tube and hidden by the bottom bracket or by the housing of the motor, so that it is not affected by weather or foreign objects.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
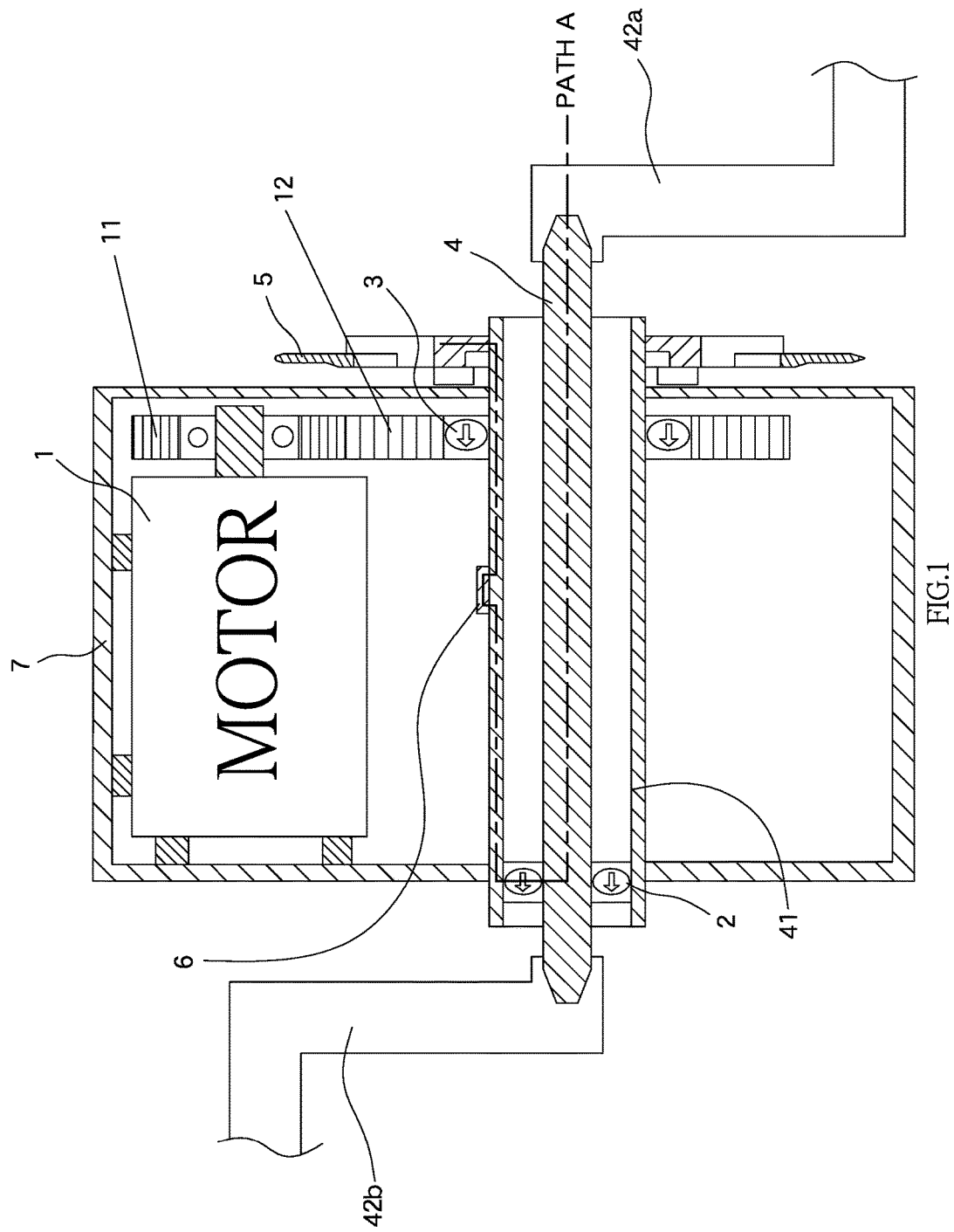
FIG. 1 is a cross sectional view to show the first embodiment of the present invention and the transmission path of the right crank.
Figure 2:
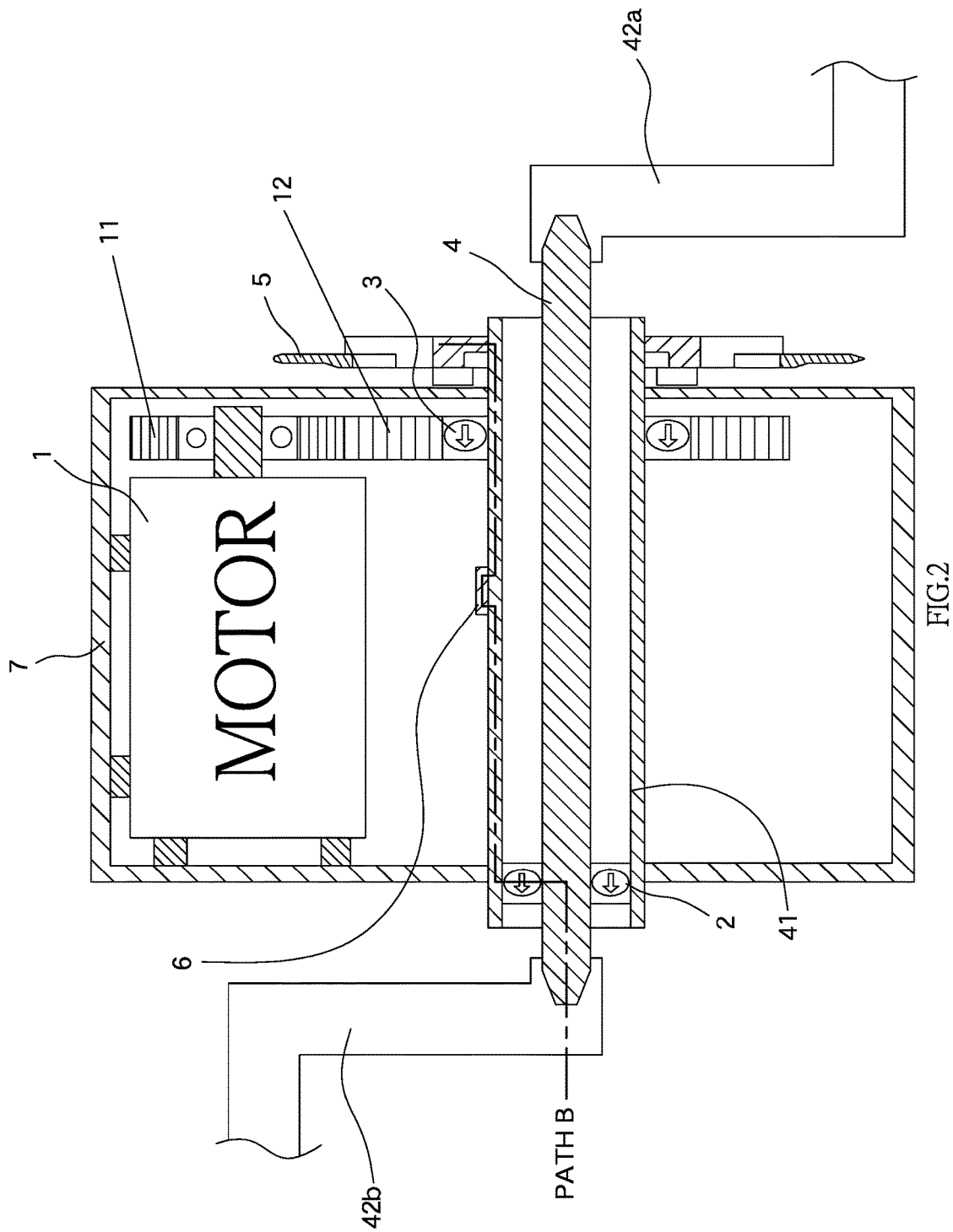
FIG. 2 is a cross sectional view to show the first embodiment of the present invention and the transmission path of the left crank.
Figure 3:
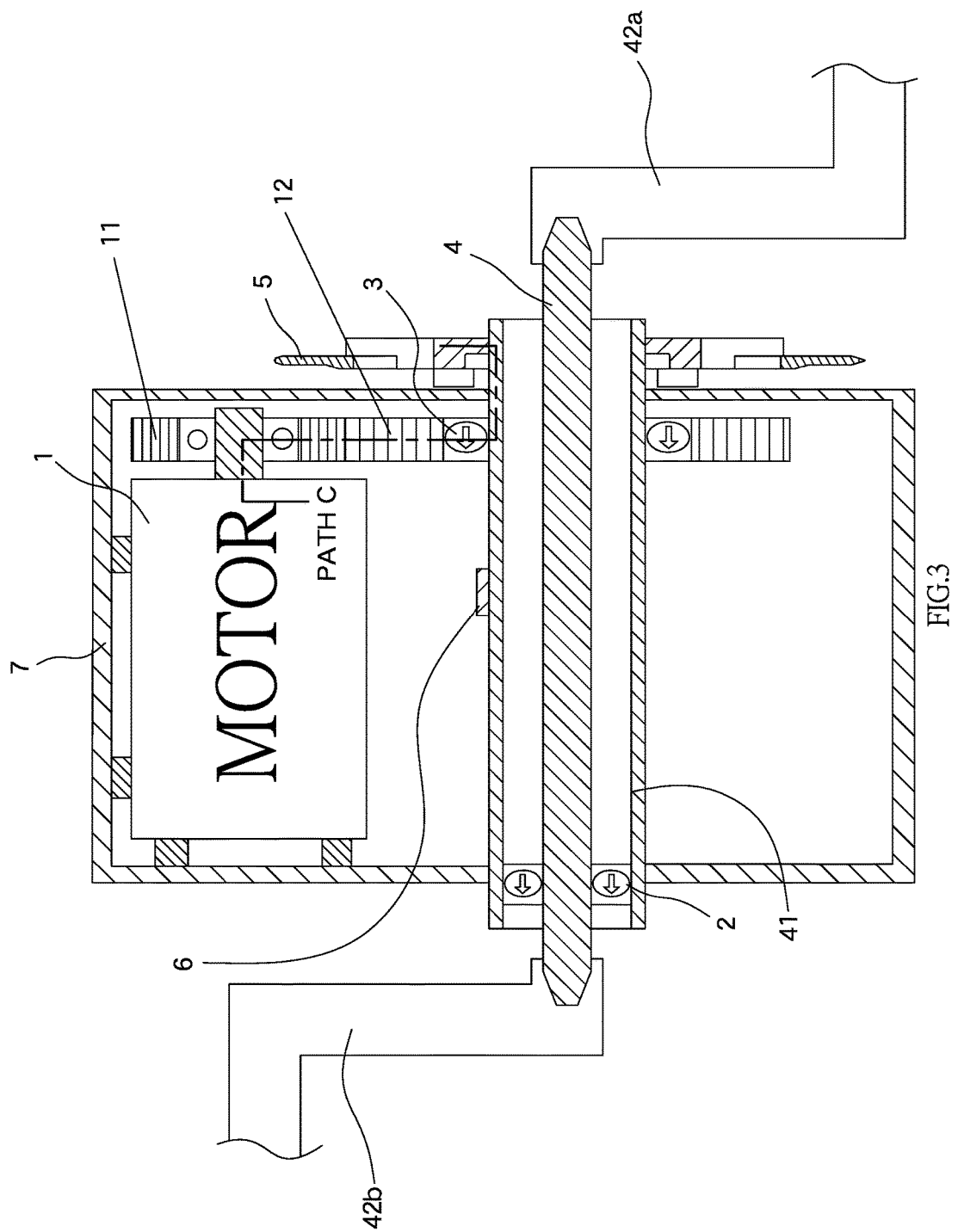
FIG. 3 is a cross sectional view to show the first embodiment of the present invention and the transmission path of the motor.

Referring to FIGS. 1 to 3, the treading torque detection device for detection of treading torque of each of the two ends of the crank of an electric bicycle of the present invention comprises a the treading torque source and a motor 1 which is installed at the middle portion of an electric bicycle. The torque from the treading torque source and the torque from the motor 1 are respectively connected to a hollow tube 41 mounted to an axle 4 via a first one-way transmission device 2 and a second one-way transmission device 3. The axle 4 and the hollow tube 41 are inserted through a bottom bracket of an electric bicycle (not shown). The chainwheel 5 is the front chainwheel of the electric bicycle. The axle 4 has two cranks 42a, 42b are respectively connected to the two ends thereof. The treading torque is transmitted by treading the cranks 42a, 42b. In this embodiment, the rotational direction of the motor 1 is the same as that of the first one-way transmission device 2. The first one-way transmission device 2 and the second one-way transmission device 3 rotate in opposite directions; however, this is not a limitation of the present invention. Any configuration where the transmissions between the first and second one-way transmission devices 2, 3 do not interfere with each other is within the scope of the present invention.

A torque detection unit 6 is connected to the hollow tube 41 and located between the first and second one-way transmission devices 2, 3. The torque detection unit 6 is a torque sensor in this embodiment.

As shown in FIG. 1, the path "A" is formed when the rider treads the right crank 42a to move the bicycle, the axle 4 is rotated by the torque output by the right crank 42a. Because the first one-way transmission device 2 is connected between the axle 4 and the hollow tube 41, so that the first one-way transmission device 2 transmits power to the hollow tube 41. On the contrary, when the left crank 42b is rotated in the opposite direction, the axle 4 is freely rotated without driving any part, so that the torque applied by the rider will be detected by the torque detection unit 6 and passed to the second one-way transmission device 3. The hollow tube 41 is freely rotated without driving any part relative to the second one-way transmission device 3, so that no matter that the motor 1 is under action or not, the torque that the rider applies will be precisely detected by the torque detection unit 6 without being affected by the magnetic torque of the motor 1. Besides, the torque that the rider applies does not affect the operation of the motor 1. Therefore, the torque passes through the one-way transmission device does not immediately output, the torque is transmitted to the chainwheel 5 via the hollow tube 41. The chainwheel 5 is the front chainwheel of the bicycle, and the front chainwheel is connected with the rear chainwheel, so that the torque is transmitted from the front chainwheel 5 can drive the bicycle forward.

As shown in FIG. 2, the path "B" is formed when the rider treads the crank 42b to move the bicycle, the axle 4 is rotated by the torque output by the right crank 42a. Because the second one-way transmission device 3 is connected between the axle 4 and the hollow tube 41, so that the second one-way transmission device 3 transmits power to the hollow tube 41. The force applied by the rider will be detected by the torque detection unit 6 and passed to the chainwheel 5 to drive the bicycle. The torque detection unit 6 and is able to precisely detect the torques from the right and left cranks 42a, 42b.

FIG. 3 shows that the motor 1 and the hollow tube 41 do not share a common axis, but this is not a limitation of the invention. The motor 1 is connected to a first gear 11 which is engaged with a second gear 12 which is connected to the second one-way transmission device 3. When the motor 1 outputs a torque, as shown in path "C", the torque drives the hollow tube 41 directly via the second one-way transmission device 3. The hollow tube 41 is freely rotated relative to the first one-way transmission device 2 and directly drives the bicycle via the chainwheel 5. The power of the motor 1 in the hollow tube 4 is transmitted as disclosed in the path "C" without passing through the torque detection unit 6. Therefore, what the torque detection unit 6 detects is not affected by the magnetic torque and power transmission of the motor 1, so that when the motor 1 is in operation, the motor 1 provides the compensation torque to the bicycle according to the actual torque that the rider applies.

In one embodiment, the hollow tube 41, the torque detection unit 6 and the axle 4 are located in the bottom bracket of the bicycle so that the torque detection unit 6 is protected and hidden by the bottom bracket. Generally, the motor 1 has a housing 7 mounted thereto in which the axle 4 is also accommodated. The torque detection unit 6 is also protected and hidden by the housing 7 so that the torque detection unit 6 is not affected by weather or foreign objects.

In order to prevent the motor 1 applies exceeded torque when the treading torque is high to cause unstable operation to the bicycle, a pre-set torque value is set in the torque detection unit 6, when the torque detection unit 6 detects the torque is higher than the pre-set torque value, the motor 1 is activated to provide a proper torque, and the detected torque is reduced to the pre-set torque value to ensure the smooth operation of the bicycle. The present invention is compact and the treading torque is easily controlled.

Figure 4:
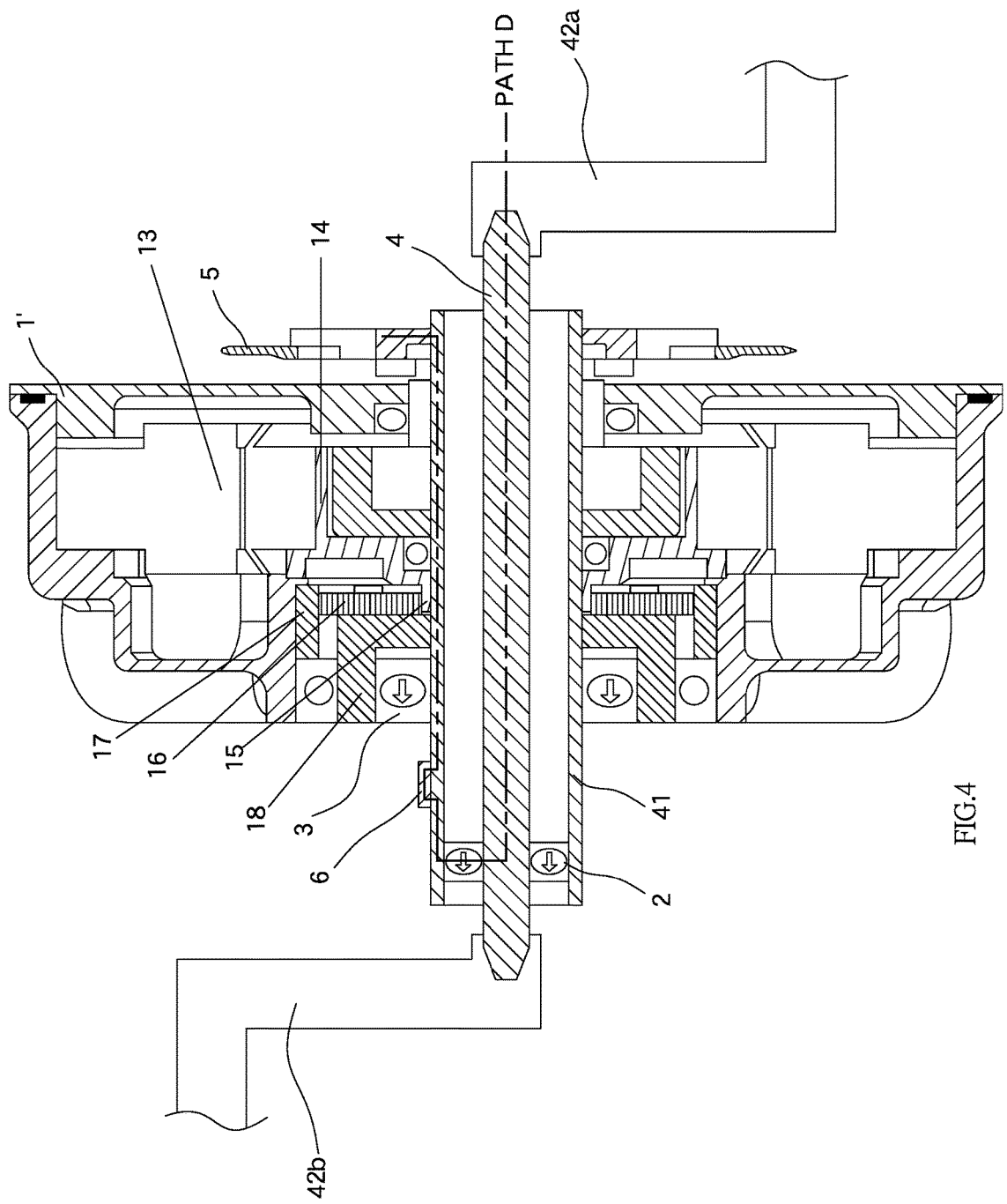
FIG. 4 is a cross sectional view to show the second embodiment of the present invention and the transmission path of the right crank.
Figure 5:
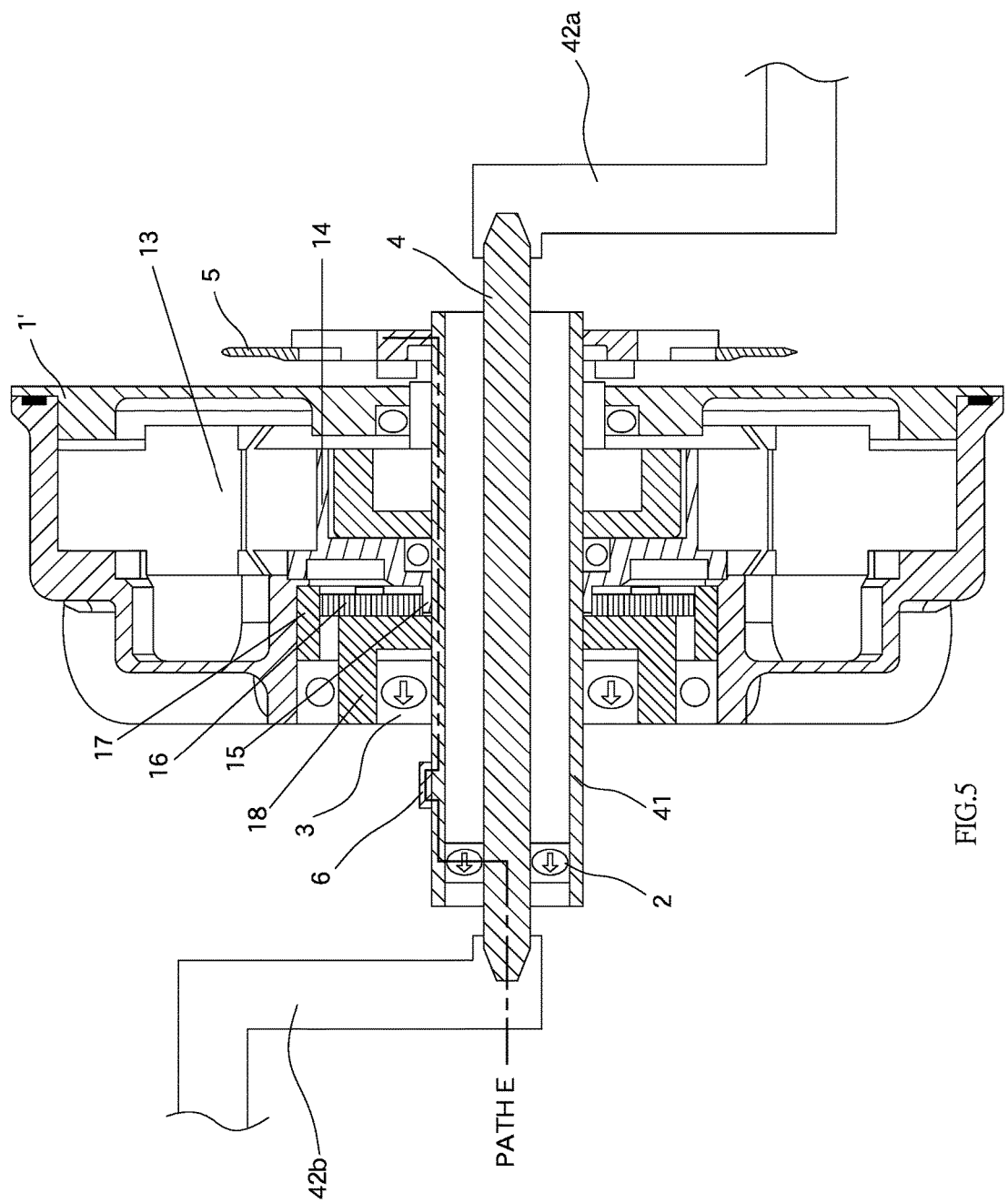
FIG. 5 is a cross sectional view to show the second embodiment of the present invention and the transmission path of the left crank.
Figure 6:
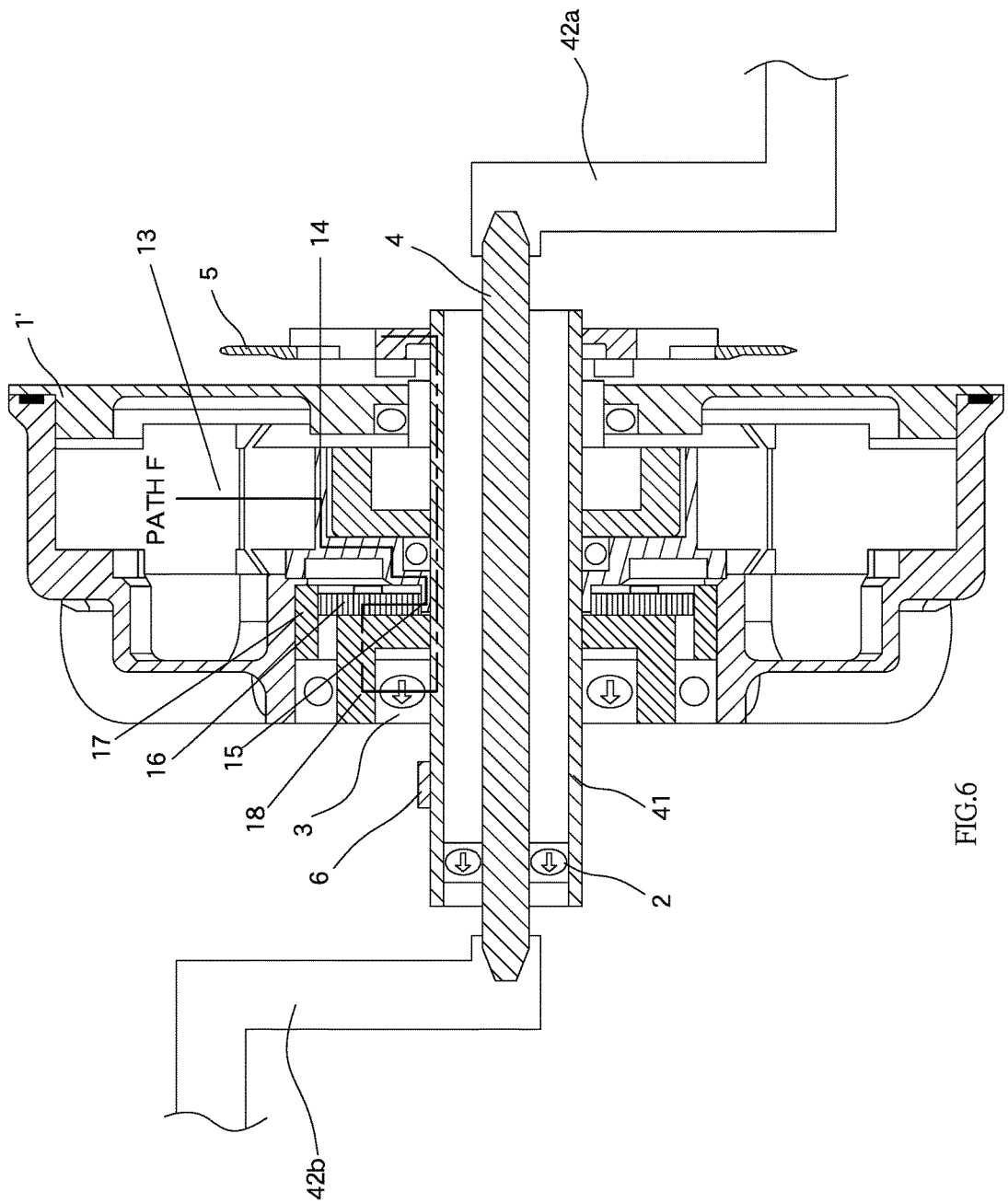
FIG. 6 is a cross sectional view to show the second embodiment of the present invention and the transmission path of the motor.

As shown in FIGS. 4 to 6, the second embodiment is disclosed, and the differences from the first embodiment are that the motor 1', the hollow tube 41 and the axle 4 share a common axis. The motor 1' comprises a stator 13, a rotor 14 which is connected with a sun gear 15. The sun gear 15 is engaged with a planet gear 16 which is engaged with a ring gear 17. The planet gear 16 is connected to a frame 18 which is connected to the second one-way transmission device 3. As shown in FIGS. 4 and 5, the path "D" and "E" are disclosed. The rider alternatively treads the right and left cranks 42a, 42b, the torque is detected by the torque detection unit 6 via the axle 41, the first one-way transmission device 2 and the hollow tube 41. As shown the path "F" in FIG. 6, when the motor 1' outputs a power, which is passes the rotor 14, the sun gear 15, the planet gear 16 and the frame 18 so as to activate the second one-way transmission device 3 which drives the hollow tube 41 and the chainwheel 5 to move the bicycle. The output power of the motor 1' is not detected by the torque detection unit 6. The rest portion of the third embodiment is similar to that of the first embodiment.

While we have shown and described the embodiment in accordance with the present invention, it should be clear to those skilled in the art that further embodiments may be made without departing from the scope of the present invention.

What is claimed is:

1. A treading torque detection device comprising:
   a treading torque source and a motor adapted to be installed at a middle portion of an electric bicycle;
   a hollow tube mounted to an axle, the treading torque source and the motor respectively connected to the hollow tube via a first one-way transmission device and a second one-way transmission device;
   a chainwheel coupled to the hollow tube, torques of the treading torque source and the motor transmitted to the chainwheel by the hollow tube; and
   a torque detection unit connected to the hollow tube and located between the first and second one-way transmission devices,
   wherein the treading torque source provides two treading torques respectively transmitted from two ends of the axle, the treading torque being transmitted to the chainwheel via the axle, the first one-way transmission device, and the hollow tube,
   wherein power output from the motor is transmitted as torque to the chainwheel via the second one-way transmission device and the hollow tube,
   wherein the power output from the motor and the treading torques from the two ends of the axle do not affect each other,
   wherein a transmission path of the torque from the motor bypasses the torque detection unit, the torque detection unit thereby distinguishing the two treading torques respectively transmitted from the two ends of the axle from the torque transmitted from the motor, and
   wherein, when the torque detection unit detects a treading torque that is higher than a pre-set treading torque level, the motor is activated to provide power, and the detected treading torque is reduced to the pre-set treading torque level.

2. The treading torque detection device as claimed in claim 1, wherein the motor and the hollow tube share a common axis.

3. The treading torque detection device as claimed in claim 1, wherein the motor and the hollow tube do not share a common axis.

4. The treading torque detection device as claimed in claim 1, wherein the torque detection unit is a torque sensor.

5. The treading torque detection device as claimed in claim 1, wherein the axle and the hollow tube are inserted through a bottom bracket of an electric bicycle.

6. The treading torque detection device as claimed in claim 1, wherein the chainwheel is a front chainwheel of an electric bicycle.

7. The treading torque detection device as claimed in claim 1, wherein the axle has two cranks respectively connected to the two ends thereof.

8. The treading torque detection device as claimed in claim 1, wherein the motor has a housing mounted thereto.

* * * * *